United States Patent [19]
Rummage

[11] Patent Number: 5,211,354
[45] Date of Patent: May 18, 1993

[54] TEXTILE CORE HAVING IMPROVED START UP GROOVE

[75] Inventor: Tony F. Rummage, Hartsville, S.C.

[73] Assignee: Sonoco Products Company, Hartsville, S.C.

[21] Appl. No.: 893,408

[22] Filed: Jun. 3, 1992

[51] Int. Cl.⁵ .......................................... B65H 75/28
[52] U.S. Cl. .................................................. 242/125.1
[58] Field of Search ............ 242/125.1, 118.3, 118.32, 242/125, 125.2, 125.3

[56] References Cited

U.S. PATENT DOCUMENTS

| | | | |
|---|---|---|---|
| 1,634,492 | 7/1927 | Dunlap | 242/118.32 |
| 2,219,836 | 10/1940 | Dunlap | 242/118.32 |
| 2,262,665 | 3/1941 | Cavanaugh | 242/125.1 |
| 3,103,305 | 9/1963 | Healtherly | 242/125.1 X |
| 3,625,451 | 12/1971 | Anderson | 242/125.1 |
| 3,717,291 | 2/1973 | Adams et al. | 242/125.1 X |
| 3,876,165 | 4/1975 | Comer | 242/125.1 |
| 3,952,179 | 4/1976 | Baker | 219/69.17 |
| 3,967,795 | 7/1976 | Shindo et al. | 242/125.1 |
| 3,986,680 | 10/1976 | Cardell | 242/125.1 |
| 4,057,201 | 11/1977 | Wilkinson | 242/125.1 |
| 4,369,933 | 1/1983 | Bedenbaugh | 242/125.1 |
| 4,371,130 | 2/1983 | Case | 242/125.1 |
| 4,907,758 | 3/1990 | Powel et al. | 242/125.1 |
| 5,029,762 | 7/1991 | Behrens et al. | 242/125.1 X |

FOREIGN PATENT DOCUMENTS

| | | | |
|---|---|---|---|
| 2647544 | 4/1978 | Fed. Rep. of Germany | 242/125.1 |
| 3923305 | 2/1990 | Fed. Rep. of Germany | 242/125.1 |

*Primary Examiner*—Stanley N. Gilreath
*Attorney, Agent, or Firm*—Bell, Seltzer, Park & Gibson

[57] ABSTRACT

The invention provides textile cores having improved start-up grooves. The start-up groove has a generally V shaped cross-section and at least one longitudinal portion of the groove, preferably the leading portion of the groove, has at least one compound angle sidewall which has a roughened surface for gripping an incoming yarn line. In addition, the invention provides an improved grooving blade having at least a longitudinal portion of its cutting surface which includes at least one compound angle sidewall with a surface roughness of between about 18 and about 45 measured on the VDI scale. In accordance with another aspect of the invention, improved grooving blades for textile cores are formed using an electric discharge machining process.

12 Claims, 3 Drawing Sheets

TEXTILE CORE HAVING IMPROVED START UP GROOVE

FIELD OF THE INVENTION

The invention is directed to an improved textile core of the type comprising an elongate tubular body having a circumferential groove for gripping an incoming yarn line for wind-up on the core. In addition, the invention is directed to an improved grooving blade for forming a start-up groove in a textile core and to a process for forming a grooving blade having a roughened exterior surface capable of providing a matte finish on the surface of the circumferential start-up groove in the textile core.

BACKGROUND OF THE INVENTION

Textile yarn cores, i.e., yarn carriers or bobbins, are employed in the textile industry for winding and supporting yarn packages. In the package forming process, a moving yarn line is strung up onto a rapidly rotating empty core. The moving yarn line is usually held by an aspirator gun and the yarn line brought into tangential contact with the rotating empty core. Typically, a start-up groove is provided in the surface of the core, normally adjacent one end of the core. The yarn line is directed into the groove which grips and breaks the yarn line thereby initiating the wind-up process.

Multiple width start-up grooves in yarn cores have been provided in an effort to improve the yarn pick up propensities of the yarn groove. In the multiple width pick up grooves, one longitudinal, i.e., lengthwise, portion of the groove is relatively wide while an adjacent longitudinal portion is relatively narrow. The core is rotated so that the wide portion of the groove forms the leading portion; the narrow portion of the groove forms the trailing portion. The transition portion of the groove then forms a "nip" for gripping and catching of the yarn.

A textile core having such a double width groove and the process for forming it are disclosed in U.S. Pat. No. 3,103,305 to Heatherly. The grooves formed according to the disclosure of this patent have a generally V shaped cross-section with the sides of the groove being curved convexly inwardly towards each other. This groove configuration is said to permit the yarn to find its proper maximum position for sliding through the wide, lead-in portion of the groove while acting with maximum efficiency to catch, hold and sever the yarn as it is pulled into the nip while raising to a higher level in the narrow portion of the groove.

Universal pick up grooves for textile cores are disclosed in U.S. Pat. No. 4,369,933 to Bedenbaugh and U.S. Pat. No. 4,371,130 to Case. The pick-up grooves described in these patents include wide lead-in portions and adjacent narrow gripping portions. Two wide lead-in longitudinal groove portions are provided, one on each end of the narrow longitudinal portion of the pick-up groove so that the tube can be rotated in either direction while providing the wide, lead-in portion of the groove at the leading edge of the groove. The disclosure of these patents is hereby incorporated herein by reference.

Textile cores having a double taper or compound start-up groove are disclosed in U.S. Pat. No. 3,717,291 to Adams, et al. which is hereby incorporated by reference. The compound angle start-up groove is advantageously formed in the core using a compound angle cutting blade. In transverse cross-section, the compound angle cutting blade is defined by a narrow angle portion at the cutting tip of the blade and a wider angle portion spaced from the cutting tip. The resultant double taper groove in the yarn tube is wider and has a greater angle taper adjacent the surface of the tube, and is narrower, with a narrower taper at the bottom of the groove. A "pinch point" for the incoming yarn line is formed by the narrow tapering portion of the groove at the bottom of the groove.

In practice, the double-taper blades employed in the above-described Adams, et al. patent are typically ground on an abrasive stone-type grinder to achieve the proper tapers. The blade manufacturing process is relatively complicated and time consuming. In addition, care must be exercised during the grinding process in order not to adversely affect the temper of the metal of the grooving blade.

In the textile industry, yarn manufacturing and wind-up speeds having continually increased. Moreover, in many cases, yarn properties including yarn strengths have increased. As yarn manufacturing speeds have increased, the need for improved gripping action by the start-up groove in the textile cores has also increased. Moreover, in the case of high strength yarns, the gripping action of the start up groove must preferably be great enough that the yarn line can be readily gripped and severed. However, it has been found that conventionally formed start-up grooves in textile yarn cores do not always reliably and repeatably perform these functions, particularly when used with different sized yarns and yarns of different strengths.

SUMMARY OF THE INVENTION

The invention provides textile cores having improved start-up grooves which can be readily formed in a single operation and which are capable of improved engagement of incoming yarn lines of various sizes. Yarn cores provided according to the invention can be manufactured in accordance with the invention using a double taper or compound angled edge knife blade which provides a textured or matte finish on the inside surface of the start-up groove for improved grasping of the in-coming yarn line. The manufacturing process employed for producing the knife blades of the invention can readily provide a roughened blade surface for providing a roughened groove surface; nevertheless, the manufacturing process provides significant benefits and advantages as compared to conventional grinding processes for preparing conventional ground surface grooving blades.

Textile yarn cores provided according to the invention comprise an elongate tubular body formed of paperboard, plastic or the like and have a substantially cylindrical groove for gripping an incoming yarn line formed in at least a portion of the periphery of the tubular body adjacent one end thereof. The groove has a generally V shaped cross-section including an open top, a closed bottom and two sidewalls disposed on opposite sides of a center line extending radially into the tubular body. At least one longitudinal portion of the groove, preferably the leading portion of the groove, has at least one compound sidewall defined in transverse cross-section by a first surface extending upwardly from the bottom of the groove and defining a first predetermined acute angle, preferably 5–5°, with the center line of the groove. A second surface of the compound sidewall extends downwardly from the top of the groove and defines a second, larger predetermined acute angle with the center line of the groove which is preferably from 15° to 45°. The compound sidewall includes a roughened surface for engaging the incoming yarn line. Advantageously, both sidewalls of this portion of the groove include the roughened compound sidewall surface discussed above. In addition, it is preferred that a second, trailing portion of the groove be a relatively narrow, simple tapered groove wherein each sidewall is disposed at an angle of from about 5° to about 15° with respect to the center line of the groove. The simple tapered portion of the groove advantageously also includes a roughened wall surface on one or both sides thereof.

The invention also provides an improved grooving blade for forming a groove in a textile core and a process for manufacturing the blade. The grooving blades of the invention have a peripheral cutting edge comprising a compound cutting surface on at least one side of the blade body. The compound cutting surface is defined in transverse cross-section by a first cutting surface adjacent the outer tip of the blade which forms a first predetermined acute angle with respect to the plane of the blade body. A second cutting surface is spaced from the outer cutting tip of the blade, is adjacent the first cutting surface, and the second cutting surface defines a second predetermined acute angle with respect to the plane of the blade body which is greater than the first predetermined acute angle. The compound cutting surface has a predetermined roughness on its exterior for forming a matte finish on the surface of a groove in a textile core.

The improved grooving blades according to the invention are formed according to another aspect of the invention, using an electric discharge machining (EDM) process which is controlled to provide a surface roughness of from about 15 to 45, measured on the VDI scale. The EDM process involves the use of electrical sparks for removing metal from the surface of a work piece. During the EDM process, the power fed to the electrode and the cycle time for electrical pulses are controlled to provide the desired roughness on the blade surface. The use of the EDM process for forming improved grooving blades according to the invention can provide a much faster manufacturing process as compared to the grinding process used in the prior art. In addition, minor differences in the cutting surface between different blades can be substantially minimized or eliminated and the temper of the metal of the grooving blade is not adversely effected.

Because textile cores according to the invention have at least a portion of the start-up groove which includes a compound angle sidewall with a roughened surface, the yarn is more readily gripped by the lower, narrower portion of the groove. In addition, the roughened, compound sidewall surface can readily accommodate different size yarns so that a single groove can efficiently be used to grip many different yarn sizes. The EDM process can readily form knife blades having one longitudinal portion of the blade surface which is of a compound angle configuration while providing a second longitudinal portion of the blade surface having a single taper i.e., simple angle configuration. This blade, in turn, can provide multiple width yarn grooves, i.e., having different widths in the leading and trailing longitudinal portions of the groove, in a single operation. Thus, textile cores according to the invention can have improved start-up grooves as compared to prior art cores; yet, the blades for forming the grooves can be more readily and simply prepared as compared to prior art blade manufacturing processes, and, these grooving blades can include substantial advantages as compared to prior art grooving blades.

BRIEF DESCRIPTION OF THE DRAWINGS

In the drawings, which form a portion of the original disclosure of the invention.

DETAILED DESCRIPTION OF THE PREFERRED EMBODIMENT

In the following, preferred embodiments of the invention are described in detail. It will be recognized that although specific terms are used in describing the invention, these are used in the descriptive sense only and not for purposes of limitation. Moreover, it will be apparent that the invention is suspectable to numerous alterations, variations and modifications within its scope.

Figure 1:
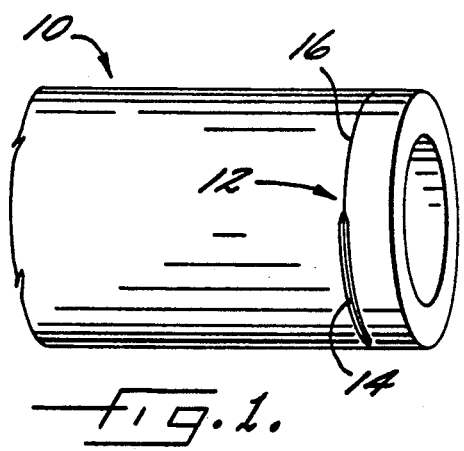
FIG. 1 is a fragmentary perspective view of a textile core according to the invention, taken at one end thereof to illustrate the preferred multiple width start-up groove.
Figure 2:
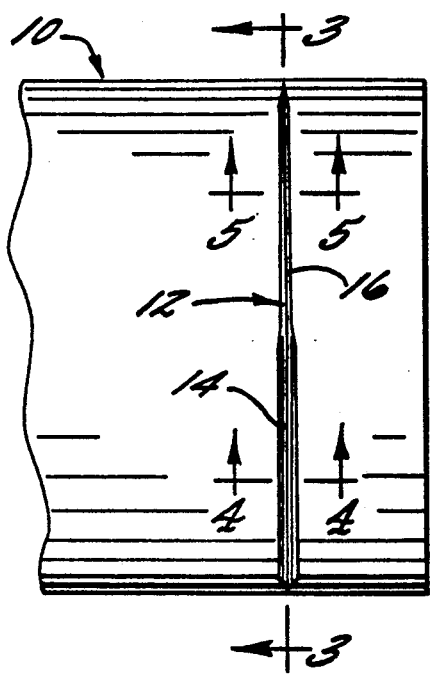
FIG. 2 is a fragmentary front plan view of the yarn core of FIG. 1 illustrating the preferred start-up groove in greater detail.
Figure 3:
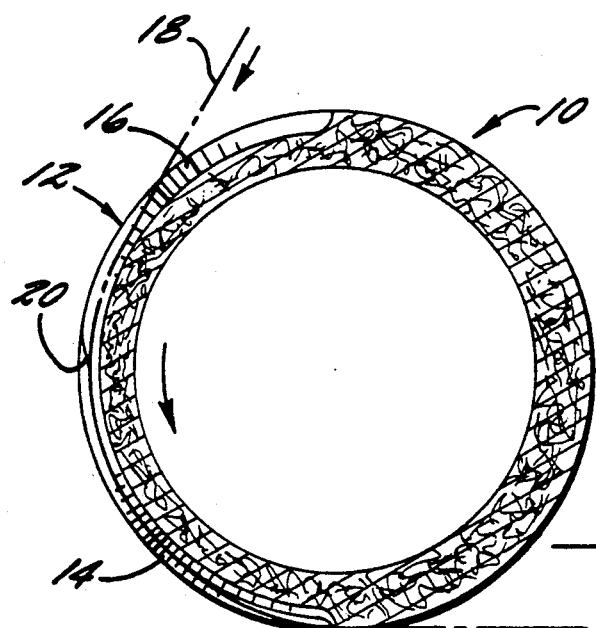
FIG. 3 is a cross-section view taken along line 3—3 of FIG. 2 and illustrates in cross-section the preferred yarn start up groove of the invention.

FIGS. 1, 2 and 3 illustrate a preferred textile core 10 according to the invention which includes a multiple width start-up groove 12. The core 10 is a tubular body formed from paperboard, e.g., spirally wound paperboard, plastic or the like. Although illustrated as having a cylindrical shape, it will be apparent that the tubular body could also have a frustroconical, spool-like shape or other shape. Typically a cylindrical textile core will have an outside diameter of from about two inches up to about seven inches, and a wall thickness of from about one-sixth inch up to about one-half inch.

The multiple width start-up groove 12 in core 10 includes a wide lead-in longitudinal portion 14 and a narrower trailing end longitudinal portion 16. As generally indicated schematically in FIG. 3, a moving yarn line 18 is contacted first with the lead-in portion 14 of groove 12 and thereafter with the narrower trailing end portion 16 of groove 12. As the yarn line 18 encounters the nip 20 between the wider and narrower portions of the groove 12 the yarn line is gripped by the groove and severed for initiation of winding of the yarn line 18 onto the core 10.

As best seen in FIG. 3, the groove 12 extends around about 180°, or about half the periphery of tube 10. The lead-in portion 14 of the groove constitutes about one half of the total groove while the trailing end portion 16 of the groove constitutes the other half of the groove. It will be apparent to the skilled artisan that the total length of the groove 12 can be greater or less than one half the periphery of the tube 10. Generally, it is preferred that the groove not extend around the full periphery of the tube so that the strength of the tube is not weakened. However, the length of the groove can readily be extended if desired. It is also seen that the length of the wider lead-in portion of the groove 14 and the narrower trailing end portion of the groove 16 are roughly the same. This relationship can also be varied if desired. In addition, two wider, lead-in longitudinal groove portions 14 can be provided, one on each end of the narrower portion 16 of the groove as explained in greater detail in the aforementioned U.S. Pat. No. 4,369,933 to Bedenbaugh and U.S. Pat. No. 4,371,130 to Case.

Figure 4:
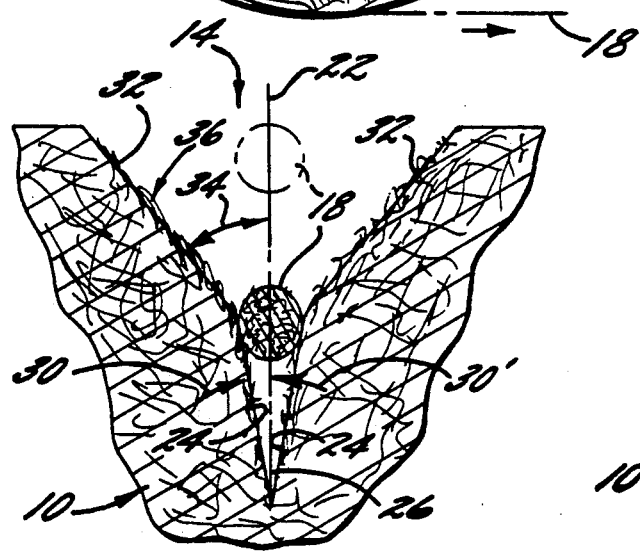
FIG. 4 is a fragmentary cross sectional view taken along line 4—4 of FIG. 2 and illustrates the generally V shaped compound angle cross section of the leading end of the groove and the roughened surface thereon according to the invention.
Figure 5:
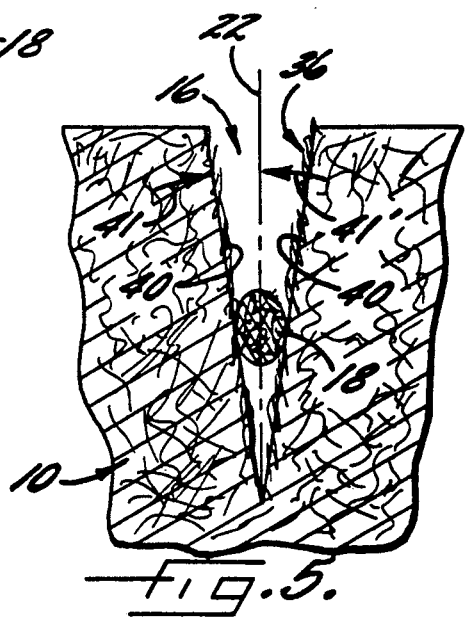
FIG. 5 is a fragmentary cross-sectional view taken along line 5—5 of FIG. 2 and illustrates the cross-section of the trailing end of the start-up groove shown in FIG. 2.

FIGS. 4 and 5 illustrate, respectively, the cross-sections of the wider, lead-in portion of the groove 14 and the narrower trailing end portion of the groove 16. In cross section, the wide lead-in portion of groove 14 is generally V shaped and has two sidewalls disposed on opposite sides of a center line 22 which extends radially into the tubular body 10. Each of the sidewalls are compound sidewalls having a first surface 24 extending upwardly from the bottom 26 of the groove and forming an acute angle with the center line as indicated by arrows 30 and 30'. A second surface 32 of each compound sidewall extends downwardly from the top of the groove 14 and defines a second predetermined acute angle with axis 22 of groove 14 as indicated by line 34. As shown in exaggerated detail in FIG. 4, the surfaces of both compound sidewalls of groove 14 have a roughened, matte finish as generally indicated by the fibers 36 on the surface of the sidewalls.

Advantageously, the angle formed between the bottom portion 24 of the compound sidewall and the center line 22 of the groove can range from less than about 5° up to about 15°, preferably 5° to 10°, while the angle formed between the upper portion of the sidewall 32 and the center line 22 can range from less than about 15° up to about 45°, preferably from about 25° to about 35°. These ranges are preferred when both sidewalls of the groove 14 are angled, i.e., tapered, with respect to the center line 22. In some cases, one sidewall may be an essentially vertical sidewall and only the other of the sidewalls will be an angled wall. In the event that only one of the sidewalls is an angled, compound sidewall, then the angles formed by the bottom wall portion and the top wall portion with the center line will typically be greater than described above. In such event, the angle formed by the bottom wall portion with the center line 22 of groove 14 will typically range from about 5° to about 30°, preferably from about 10° to about 20° while the angle formed between upper sidewall 32 and the center line 22 will range from about less than 30° up to 75°, preferably from about 45° to about 75°. It is preferred that both sidewalls have a textured surface; however, if desired, only one of the sidewalls can have a roughened or textured surface.

The compound angle groove illustrated in FIG. 4 is believed to readily accommodate yarns having any of various counts or deniers, ranging, for example on the denier scale, from 30 denier or less up to 2,000 denier or greater. In this regard, the wider portion of the groove at the top thereof is able to receive and grip larger yarns while the narrower portion of the groove, at the bottom thereof is capable of receiving and gripping smaller size yarns. Because the inside surface of the groove is roughened or textured, the yarn is more readily gripped by the groove as compared to previous start-up grooves having a smooth interior surface.

The cross-section of the narrower portion 16 of the groove 12 is seen in FIG. 5. Advantageously, this groove portion includes two simple or straight angled walls 40, each of which form an acute angle with center line 22 of the groove 16 as generally indicated by arrows 41 and 41'. Typically, when there are two angled sidewalls as illustrated in FIG. 5, the angle formed by each sidewall and the center line 22 will range from less than about 5°, up to about 20°, preferably from about 5° to about 10°. If only one sidewall is angled, then the angle formed by the sidewall and the center line of the groove will range from about 10° up to about 45°, preferably from about 10° to about 20°. As illustrated in FIG. 5, at least one or both sidewalls has a roughened or matte finish surface 36.

The narrow tapered portion of the groove 16, generally shown in FIG. 5, can be eliminated in some instances because of the improved gripping power of the compound angle, rough textured portion of the groove 14. Thus, in accordance with one aspect of the invention, the entire groove may have substantially the same compound angle sidewall cross-section extending from end to end of the groove. As indicated previously, the combination of angled sidewalls and matte textured surface on the sidewall improves the gripping power of the groove for a variety of yarns of different sizes thereby eliminating, in many instances, the necessity of also having a narrow angled portion of the groove 16.

Figure 6:
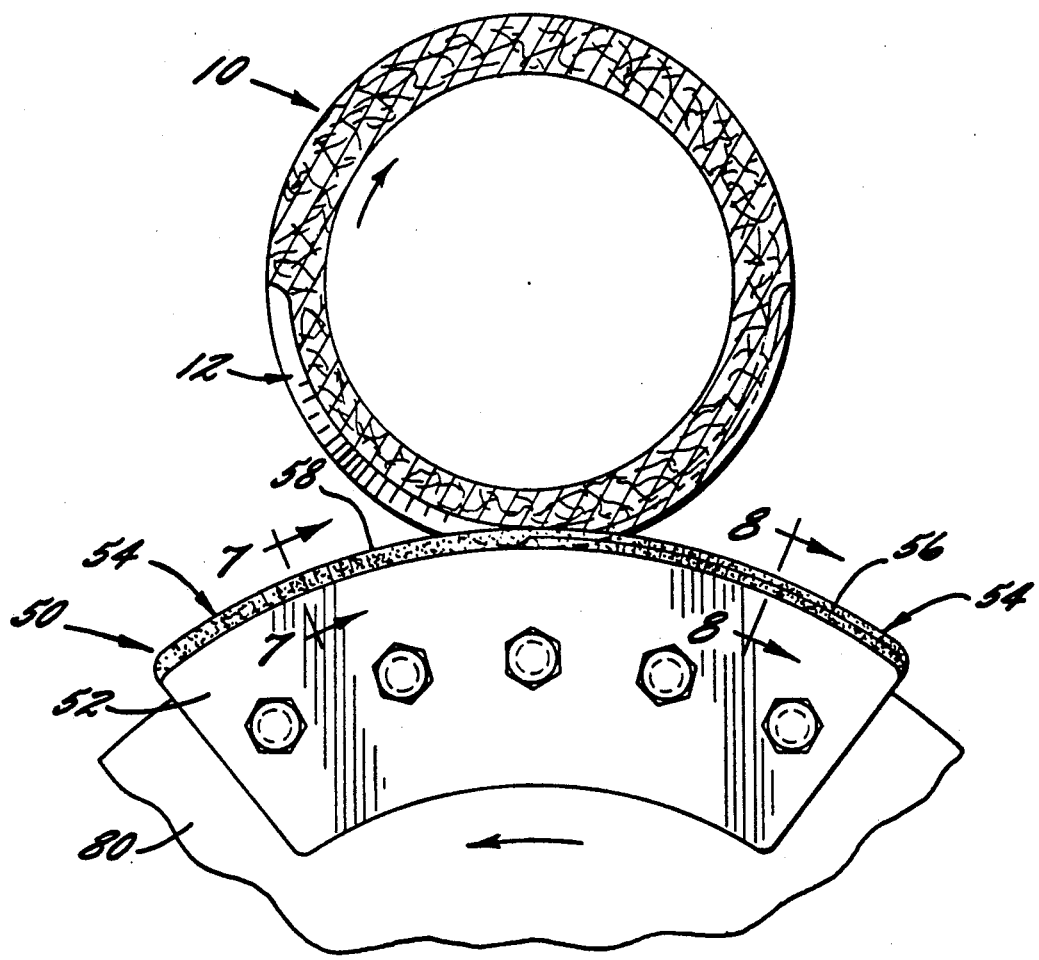
FIG. 6 illustrates a preferred multiple width groove forming process used according to the invention wherein a grooving blade having a roughened compound blade surface on one portion thereof and a roughened blade of a simple, single angle surface on another portion thereof is employed for forming the start-up groove.
Figure 7:
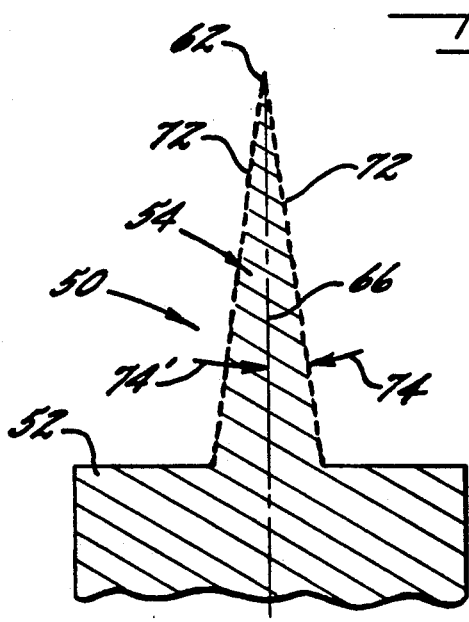
FIG. 7 is a fragmentary enlarged cross-sectional view taken along line 7—7 of FIG. 6 and illustrates the roughened simple angle blade surface used to form the trailing end of the yarn groove.
Figure 8:
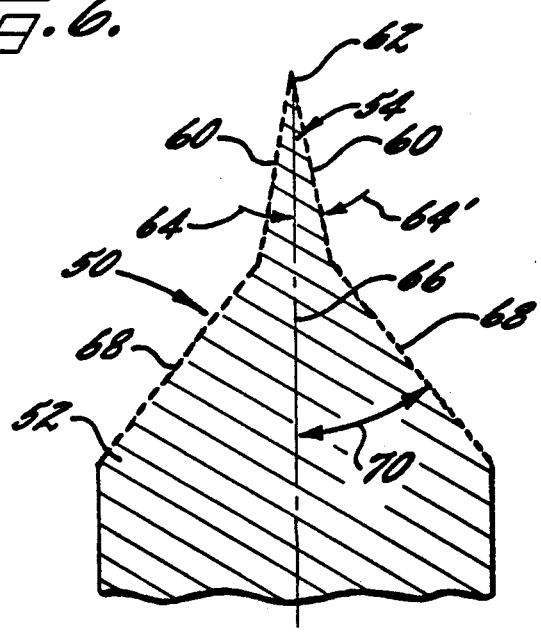
FIG. 8 is a fragmentary enlarged cross-sectional view taken along line 8—8 of FIG. 6 and illustrates the roughened compound angle portion of the blade surface used to form the lead-in portion of the groove.

FIGS. 6, 7 and 8 illustrate generally a preferred knife blade used in forming the textile cores of the invention and the process of forming the cores. As best seen in FIG. 6, the grooving blade 50 includes a substantially planar blade body 52 having two opposed sides and including a peripheral, arcuate, knife-like cutting edge 54. The peripheral cutting edge 54 includes a first longitudinal portion thereof, 56 having a compound cutting surface and a second longitudinal portion 58 having a simple taper cutting surface. The compound surface is best seen in FIG. 8 which illustrates a blade having compound cutting surfaces on both sides of the blade body. As seen in FIG. 8, each compound cutting surface is defined by a first cutting surface 60 adjacent the outer tip 62 of the cutting edge 54. The first cutting surface forms a first predetermined acute angle with the plane 66 of the blade body as generally indicated by arrows 64 and 64'. The compound cutting edge also includes a second cutting surface 68 which is spaced from the outer tip 62 of the cutting edge 54 and is adjacent the first cutting surface 60. The second cutting surface 68 forms a predetermined acute angle with the central plane 66 of the blade body as indicated by arrows 70. This acute angle is larger as compared to the angle formed by the first cutting surface 60 and the central plane 66 of the blade body. Both of the cutting surfaces 60 and 68 are illustrated as roughened.

The second longitudinal portion 58 of the peripheral cutting surface 54 of blade 50 is illustrated in FIG. 7. Each of the two cutting surfaces 72 on opposite sides of central plane 54 are simple angled surfaces. Each of the surfaces 72 forms a predetermined acute angle as generally indicated by arrows 74 and 74' with the central axis 54 of blade body 52. It will be apparent that the angles formed by the cutting surfaces 72, 60 and 68 of the various portions of the cutting edge of the blade correspond in substance to the angles of the sidewalls of the groove in the textile core as discussed previously in connection with FIGS. 4 and 5. It will also be apparent that one side of the peripheral cutting surface of the blade body can be substantially vertical when it is desired to form only a single angled sidewall groove in the textile core.

The knife blade 52 is used to form the groove 12 in core 10 using conventional apparatus as generally illustrated in FIG. 6. Thus, the knife blade 50 is attached to a rotating means 80 of a conventional type and brought into pressure contact with tube 10 which is also rotated by a means not shown. The knife blade is pressed into the tube body 10 during rotation of both the blade and the tube body to thereby form a multiple width start up groove 12 in the tube body during a single operation. Although FIG. 6 illustrates rotation of the core 10 in the clockwise direction and rotation of the blade counter-clockwise, it will be apparent that these directions can be reversed. It will also be apparent that although knife blade 50 is shown having a curved surface, that blades having a straight surface can also be used. Similarly, although the knife blade 50 has an arcuate cutting surface which extends less than a full 360°, the blade 50 can readily be provided in the form of a circular cutting blade.

Figure 9:
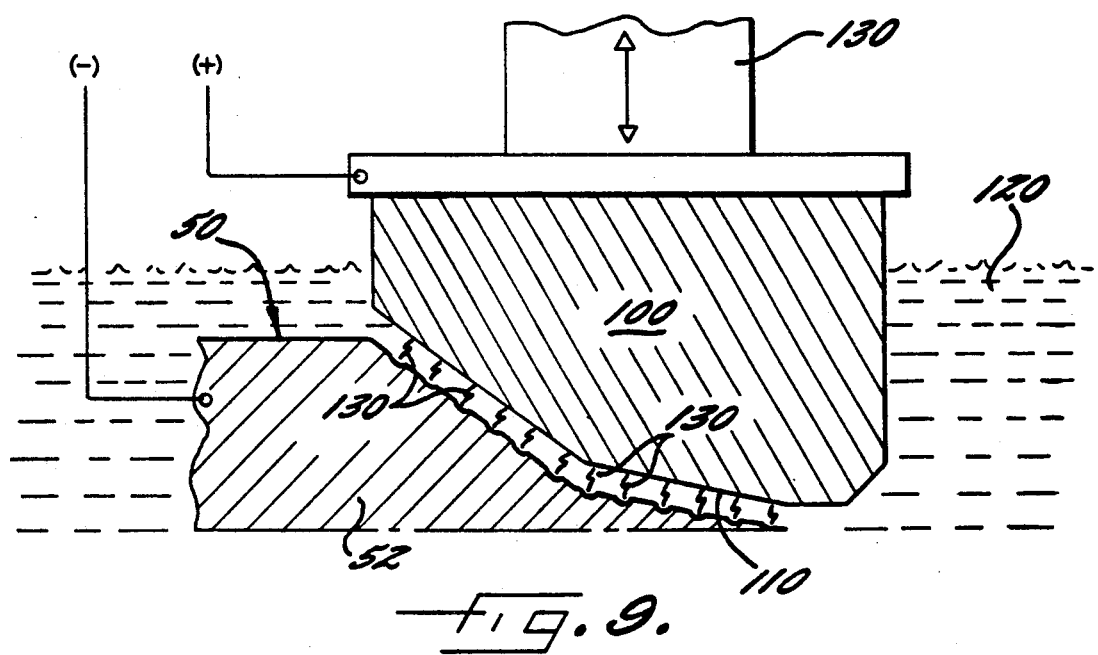
FIG. 9 schematically illustrates a preferred EDM process employed for forming grooving blades according to the invention.

A preferred EDM process employed in forming the knife blades of the invention is schematically shown in FIG. 9. An electrode 100 which has a shaped forming surface 110 is used to form the cutting surface on blade body 50. The electrode 110 and the blade body 50 are separated by an insulating dielectric medium 120. The electrode 100 is attached via a holder 130 which in turn is attached to a servo motor (not shown) for raising and lowering of the electrode so that it is adjacent the surface of the blade body 50. With a pulsed DC current applied between the electrode and the blade body 50, an increasing electrical stress is created on the dielectric fluid which results in the generation of a plurality of destructive sparks 130 which vaporize portions of the surface of the blade body forming a plurality of saucer-shaped craters on the surface thereof. The size of the indentations formed on the blade body is controlled by the power, i.e., amperage, applied to the electrode and by the cycle time, that is, the length of time that the electrode is switched on. The roughness of the finish on the surface of the blade is, in turn, determined by the size of the craters formed on the surface of the blade body.

In EDM processing, the surface roughness is measured on a "VDI" scale. In general, a VDI scale finish ranging from about 18 (very rough finish) to about 45 (less rough finish) can provide a suitably roughened groove surface. It will be apparent to the skilled artisan that the roughness imparted to the groove of a textile core by the roughened cutting surface of the blade will be dependant, at least in part, upon the material forming the textile core. Thus, the surface roughness of the cutting surfaces of the blade body can be adjusted, preferably within the limits discussed above, depending on whether a low density or high density paperboard core or a plastic textile core is contacted with the cutting surface of the blade. A preferred VDI roughness for the cutting surface of the blade when used on paperboard cores can range from about 30 to about 35, preferably about 32.

The EDM process employed to form grooving blades according to the invention provides numerous advantages as compared to grinding processes employed in the prior art. The EDM process car readily be employed to provide cutting blades having different cutting surfaces on different longitudinal portions of the blade cutting edge. Thus, blades having one longitudinal portion which comprises a compound cutting surface and a second longitudinal portion which comprises a simple cutting surface, substantially as shown in FIG. 6, can be readily formed by the EDM process. This, in turn, allows a double width start-up groove to be formed in a textile core in a single cutting operation. Moreover, the roughness of the blade surface can be readily controlled during the EDM process as described above. Thus, blades having roughened cutting surfaces of varying degrees can readily be formed. Still further, because the cutting surface of the blade matches the surface of the electrode, multiple blades having substantially identical cutting surfaces can readily be formed using the EDM process. As indicated previously, in addition to being more accurate, the EDM process is typically faster than a conventional grinding process, and the temper of the blade is not adversely affected during the EDM cutting edge forming process.

In one preferred embodiment of the invention, a blade substantially as shown in FIG. 6 is advantageously used to form grooves in textile tubes wherein the single tapered, narrower wall portions of the groove, each form an acute angle of 8° with the center plane of the groove, and wherein the compound wall portions of the groove form 10° and 40° angles with respect to the center axis of the groove. The cutting depth of the blade is approximately 0.19 inches. In the case of the compound wall portion of the groove, the wider tapered portion of the groove has a depth about twice that of the narrower portion of the groove; that is, the narrower, bottom portion of the groove is about ⅓ the groove height, whereas the upper, wider portion of the groove is about 2/3 the groove height. It will be apparent that groove depth will vary depending on wall thickness of the tube.

The invention has been described in considerable detail with reference to its preferred embodiments. It will be apparent, however, that numerous variations and modifications can be made without departure from the spirit and scope of the invention as described in the foregoing detailed specification and defined in the appended claims.

That which is claimed is:

1. A textile core comprising an elongate tubular body for supporting a yarn package and comprising:

a substantially circumferential groove for gripping an incoming yarn line for windup on said core, said groove being formed in at least a portion of the periphery of said tubular body adjacent one end thereof;

said groove having a generally V shaped cross-section including an open top, a closed bottom and two sidewalls disposed on opposite sides of a center line extending radially into said tubular body, at least a first longitudinal portion of said groove having a first compound sidewall defined in transverse cross-section by a first surface extending upwardly from the bottom thereof and defining a first predetermined acute angle with said center line and a second surface extending downwardly from the top of said groove and defining a second predetermined acute angle with said center line, said second predetermined acute angle being greater than said first predetermined acute angle;

said compound sidewall of said groove having a substantially uniformly roughened matte surface finish provided by fibers of the material forming the elongate tubular body for engaging said incoming yarn line.

2. The textile core according to claim 1 wherein said tubular body comprises paperboard.

3. The textile core of claim 1 wherein said first longitudinal portion of said groove additionally comprises a second compound sidewall, said second compound sidewall being defined in transverse cross-section by a first surface extending upwardly from the bottom of said groove and defining a first predetermined acute angle with said center line of said groove and a second surface extending downwardly from the top of said groove and defining a second predetermined acute angle with said center line of said groove, said second predetermined acute angle being greater than said first predetermined acute angle.

4. The textile core of claim 3 wherein said first predetermined acute angle formed between said first surface of said first sidewall and said center line of said groove is substantially the same as the first predetermined angle formed between said first surface of said second sidewall and said center line of said groove and wherein said second predetermined angle formed between said second surface of said first sidewall and said center line of said groove is substantially the same as the second predetermined angle formed between said second surface of said second sidewall and said center line of said groove.

5. The textile core according to claim 1 wherein said first predetermined acute angle is between about 5° and about 15° and wherein said second predetermined angle is between about 15° and about 45°.

6. The textile core of claim 4 wherein each of said first predetermined acute angles are between about 5° and about 20° and wherein each of said second predetermined acute angles are between about 15° and about 45°.

7. The textile core of claim 1 wherein said groove includes a second longitudinal portion adjacent said first longitudinal portion, said second longitudinal portion of said groove having at least a first single taper sidewall, said sidewall having a roughened surface for engaging said incoming yarn line.

8. The textile core according to claim 7 wherein said second longitudinal portion of said groove includes a second single taper sidewall extending from the top to the bottom of said groove and having a roughened surface for engaging said incoming yarn line.

9. The textile core according to claim 8 wherein said first side wall of said second longitudinal portion of said groove forms an angle of between about 5° and about 20° with the center line of said groove.

10. The textile core of claim 9 wherein said second sidewall of said second longitudinal portion of said groove forms an angle of between about 5° and about 20° with the center line of said groove.

11. The textile core of claim 1 wherein said tubular body has a substantially cylindrical shape.

12. The textile core of claim 1 wherein said tubular body has a substantially frustroconical shape.

* * * * *

UNITED STATES PATENT AND TRADEMARK OFFICE
CERTIFICATE OF CORRECTION

PATENT NO.  : 5,211,354
DATED       : May 18, 1993
INVENTOR(S) : Tony F. Rummage It is certified that error appears in the above-identified patent and that said Letters Patent is hereby corrected as shown below:

On title page, item [56], References Cited, U.S. PATENT DOCUMENTS

"Healtherly" should be -- Heatherly --.

Column 2, line 67, "5-5°" should be -- 5-15° --.

Column 7, line 52, "cf" should be -- of --.

Signed and Sealed this

Eighteenth Day of January, 1994

Attest:

BRUCE LEHMAN

Attesting Officer

Commissioner of Patents and Trademarks